(12) United States Patent
Toll et al.

(10) Patent No.: US 7,103,751 B1
(45) Date of Patent: Sep. 5, 2006

(54) METHOD AND APPARATUS FOR REPRESENTATION OF AN ADDRESS IN CANONICAL FORM

(75) Inventors: Bret L. Toll, Hillsboro, OR (US); John Alan Miller, Portland, OR (US); Michael A. Fetterman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 10/186,004

(22) Filed: Jun. 27, 2002

(51) Int. Cl.
*G06F 12/00* (2006.01)

(52) U.S. Cl. .............. 711/220; 711/202; 711/203; 712/216

(58) Field of Classification Search ........ 711/205–214, 711/217, 220, 202–203; 714/52–53; 341/50–107; 712/2–7, 24, 26, 208–216, 226, 330
See application file for complete search history.

(56) References Cited

U.S. PATENT DOCUMENTS

| | | | | |
|---|---|---|---|---|
| 5,710,885 | A | * | 1/1998 | Bondi ..................... 709/224 |
| 5,751,942 | A | | 5/1998 | Christensen et al. |
| 5,812,792 | A | * | 9/1998 | Haddock et al. ........... 709/249 |
| 5,829,041 | A | * | 10/1998 | Okamoto et al. ........... 711/147 |
| 6,014,742 | A | | 1/2000 | Krick et al. |
| 6,018,786 | A | | 1/2000 | Krick et al. |
| 6,073,213 | A | | 6/2000 | Peled et al. |
| 6,076,144 | A | | 6/2000 | Peled et al. |
| 6,170,038 | B1 | | 1/2001 | Krick et al. |
| 6,175,571 | B1 | * | 1/2001 | Haddock et al. ............ 370/423 |
| 6,182,210 | B1 | | 1/2001 | Akkary et al. |
| 6,216,206 | B1 | | 4/2001 | Peled et al. |
| 6,240,509 | B1 | | 5/2001 | Akkary |
| 6,671,791 | B1 | * | 12/2003 | McGrath ..................... 711/206 |
| 6,694,322 | B1 | * | 2/2004 | Warren et al. .............. 707/101 |
| 6,807,616 | B1 | * | 10/2004 | McGrath et al. ............ 711/206 |
| 2002/0080808 | A1 | * | 6/2002 | Leung ........................ 370/412 |
| 2002/0108028 | A1 | * | 8/2002 | Nunoe ........................ 712/233 |

OTHER PUBLICATIONS

Microsoft Computer Dictionary (Fifth Edition).*
X86-64™ Technology White Paper AMD, "Advanced Micro Devices, Inc. x86-64™ Technology White Paper", Advanced Micro Devices, Inc., One AMD Place, Sunnyvale, CA 94088, pp. 1-13.
Preliminary Information, "AMD 64-Bit Technology, The AMD x86-64™ Architecture Programmers Overview", AMD, Publication #24108 Rev:C, Issue Date Jan. 2001, 134 pages.

* cited by examiner

*Primary Examiner*—Brian R. Peugh
*Assistant Examiner*—Hashem Farrokh
(74) *Attorney, Agent, or Firm*—Larry M. Mennemeier

(57) ABSTRACT

A method and apparatus for representing an address in canonical form. The address is received and an error indicator is computed according to whether the address is received in a correct canonical form. The error indicator is stored together with a portion of the address, the portion being less than the entire address. The error indicator, together with the portion of the address stored, represent the address received.

32 Claims, 13 Drawing Sheets

| N-bit Address | M-bit Compact |
|---|---|
| FFFF FFFF FFFF FFFF − | 1 FFFF FFFF FFFF |
| FFFF 8000 0000 0000 − | 1 8000 0000 0000 |
| FFFF 7FFF FFFF FFFF − | 1 7FFF FFFF FFFF |
| 0000 8000 0000 0000 − | 0 8000 0000 0000 |
| 0000 7FFF FFFF FFFF − | 0 7FFF FFFF FFFF |
| 0000 0000 0000 0000 − | 0 0000 0000 0000 |

711 (brackets rows 3-4), 701

FIG. 7a

| N-bit Address | M-bit Compact |
|---|---|
| FFFF FFFF FFFF FFFF − | 2 FFFF FFFF FFFF |
| FFFF 8000 0000 0000 − | 2 8000 0000 0000 |
| FFFF 7FFF FFFF FFFF − | 2 7FFF FFFF FFFF |
| 0000 8000 0000 0000 − | 3 8000 0000 0000 |
| 0000 7FFF FFFF FFFF − | 3 7FFF FFFF FFFF |
| 0000 0000 0000 0000 − | 3 0000 0000 0000 |

721 (brackets rows 3-4), 702

FIG. 7b

METHOD AND APPARATUS FOR REPRESENTATION OF AN ADDRESS IN CANONICAL FORM

FIELD OF THE DISCLOSURE

This disclosure relates generally to the field of processors. In particular, the disclosure relates to representations of virtual or physical addresses.

BACKGROUND OF THE DISCLOSURE

While a majority of the microprocessors used in personal computers may be 32-bit processors, there are applications that address larger amounts of virtual and physical memory. High-performance servers, computer aided design tools and database management systems, for example, can make use of larger address spaces and therefore may benefit from being able to perform computations on addresses more than 32-bits.

Modern computers often provide two distinct memory spaces: a virtual address space for the convenience of programmers, and a physical address space for system hardware designers. Extensions in digital data sizes are often made at convenient powers of two, for example: 8-, 16-, 32-, and 64-bits, etc. Practically though, it may not be necessary or economical to support a full 64-bit virtual address space in a microprocessor, let alone populate a 64-bit physical address space with memory. Therefore, a smaller address space may be defined, but defined in such a way as to provide for future expansions as necessary.

One form of an address, which may be useful for this purpose is called a canonical address form. For example, an address may be said to be in one type of canonical address form if all of the most significant bits, higher than some conveniently chosen number of address bits, are of the same value. That is to say that an M-bit virtual address space (M being an integer less than 64) may be supported inside a 64-bit virtual address space where all of the bits in the addresses starting from bit position M−1 to bit position 63 are of the same value (either all ones, or all zeroes).

An advantage of using canonical addresses is that expansion of the usable address space is possible. For example, an expansion from M bits to M+1 bits doubles the addressable storage space for newer programs while permitting older programs to execute correctly without modification.

One disadvantage of using an address in canonical form is that results of address computations may from time to time produce addresses that are not in a valid canonical form and so such results need to be checked to prevent errors. For example, if a 48-bit virtual address space is supported by a 64-bit canonical address then it may be necessary to check each of the most significant 16 bits (bit 63 through bit 48) against the value of the $48^{th}$ bit (bit 47) to determine whether an address computation has produced a result in canonical form.

Another disadvantage is that the upper address bits do not provide addressing functionality, yet their support may require additional storage space, wider interconnects and additional digital logic. Any or all of these requirements may contribute to undesirable business consequences such as added costs and lower yields.

BRIEF DESCRIPTION OF THE DRAWINGS

The present invention is illustrated by way of example and not limitation in the figures of the accompanying drawings.

FIG. 7a illustrates one embodiment of a compact representation for a 64-bit canonical address.

FIG. 7b illustrates an alternative embodiment of a compact representation for a 64-bit canonical address.

DETAILED DESCRIPTION

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Disclosed herein is an apparatus and a process for efficiently representing an address. For one embodiment, the address may be received in a canonical form, which provides for future expansion of the addressable storage space. A more efficient representation of the address may be achieved through the computation of an error indicator according to whether the form of the address received is a valid canonical form. The error indicator may be stored together with a portion of the address, the portion being less than the entire address. The error indicator together with the portion of the address stored, more efficiently represent the address received.

For an alternative embodiment, an address may be efficiently computed from one or more efficient representations comprising error indicators and address portions through use of arithmetic and/or logical devices. Optionally, error checking may be performed during the computation and a fault condition may be identified. An address in canonical form may be produced from the result of such computations by using an error indicator of the result to expand an address portion of the result into a valid canonical form. Optionally, the error indicator of the result may also be used to expand the address portion of the result into an invalid canonical form.

It will be appreciated that benefits such as: improvements in computation speed, simplification of error checking, reductions in the cost of production, savings in area and increases in yields, may be accomplished through the use of compact representations of canonical addresses.

As described above, incremental expansion of an address space may be provided through a canonical address space. One way of describing such canonical addresses is to say that supported addresses of a given number of bits are sign extended to a larger number of a; bits, thereby providing for incremental expansion up to the specified larger number of bits. Typically, memory addresses are considered to be unsigned numbers ranging from low memory addresses (all zeroes) to high memory addresses (all ones) but for the sake of clarity in the following discussion, it may be convenient, at times, to distinguish positive addresses from negative addresses.

Figure 1:
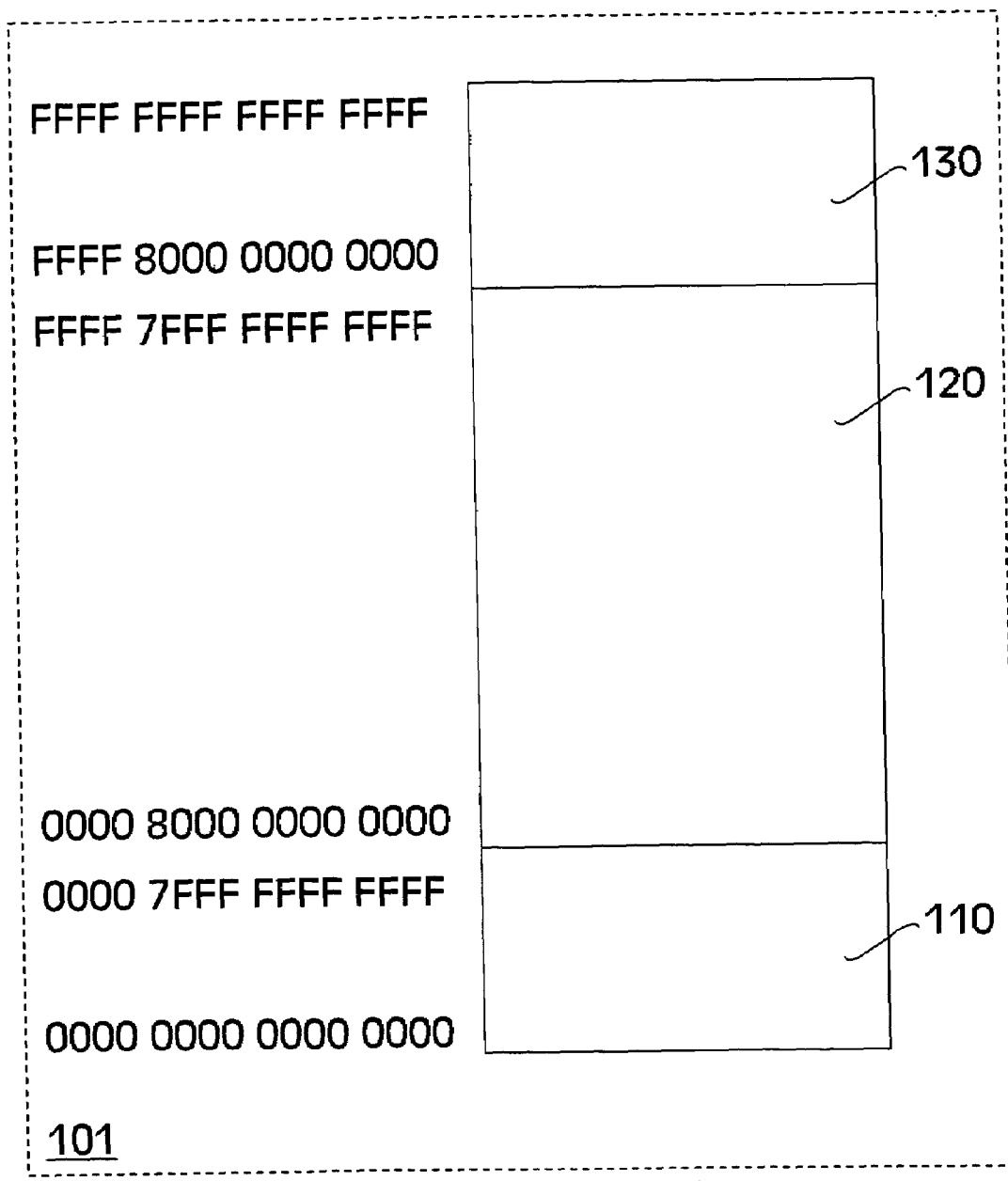
FIG. 1 illustrates a canonical address space.

For example, FIG. 1 illustrates a 64-bit address space 101 including non-canonical address space 120, and 48-bit canonical address spaces 110 and 130. In the canonical address space 110, the addresses extend from the lowest 64-bit hexadecimal address of 0000 0000 0000 0000, to the highest positive 48-bit hexadecimal address of 7FFF FFFF FFFF, which is sign extended to 64-bits. In the canonical address space 130, the addresses extend from the lowest negative 48-bit hexadecimal address of 8000 0000 0000, which is sign extended to 64-bits, to the highest negative 64-bit hexadecimal address of FFFF FFFF FFFF FFFF. The addresses in the non-canonical address space 120 are all the addresses between hexadecimal addresses 0000 8000 0000 0000 and FFFF 7FFF FFFF FFFF inclusive.

Figure 2:
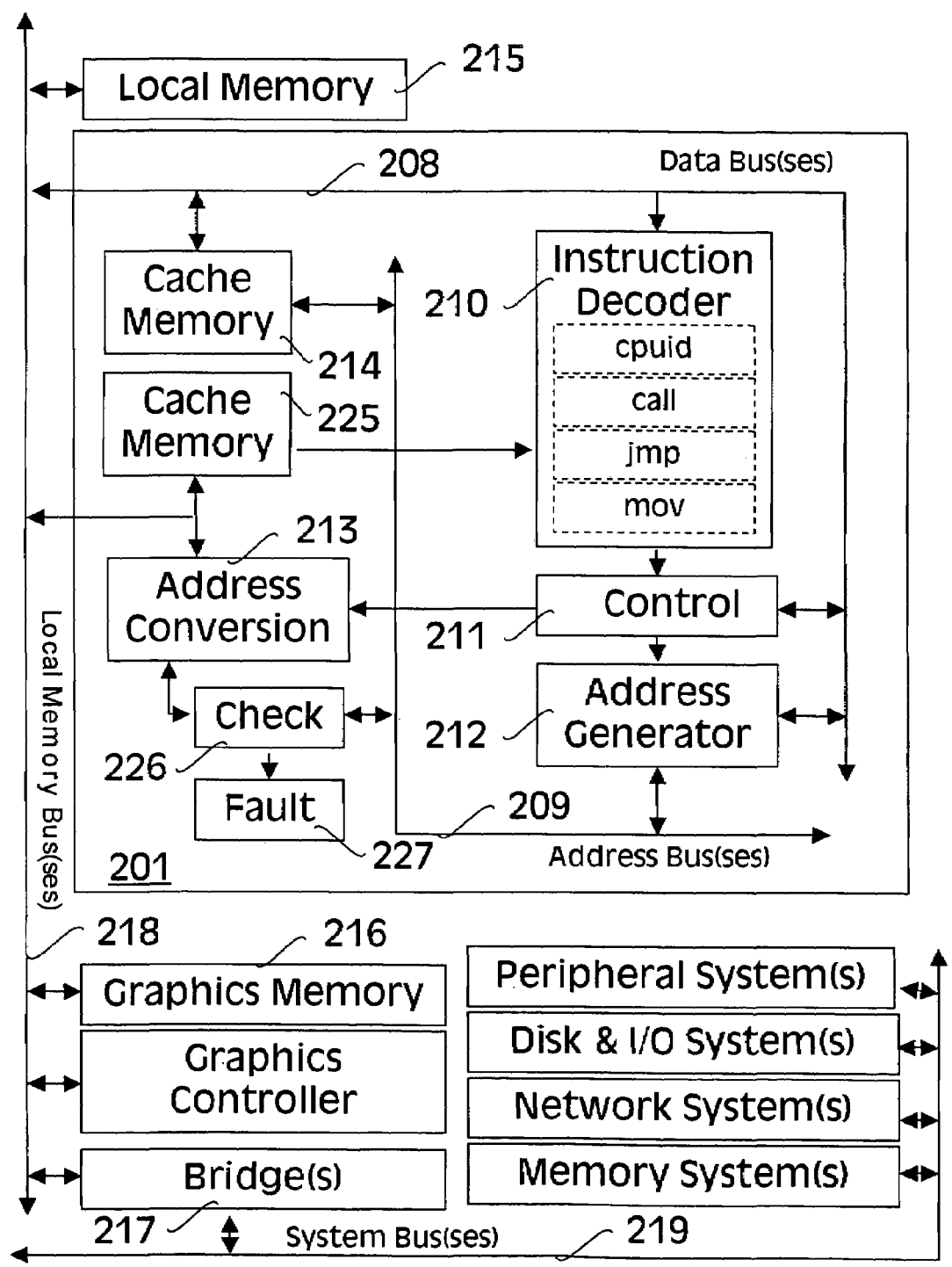
FIG. 2 illustrates one embodiment of a computing system, which uses addresses in a compacted canonical form.

FIG. 2 illustrates one embodiment of an exemplary computing system, which uses addresses in a compacted canonical form. The computing system comprises processor 201, local memory bus(ses) 218 and local memory 215. Local memory 215 is addressable by processor 201 through physical addresses. Processor 201 includes address conversion logic 213 for converting addresses from a compacted canonical form to physical addresses suitable to addressing local memory 215 and cache memory 225. For one embodiment, processor 201 also includes address generator 212 for generating addresses in a compacted canonical form suitable to addressing cache memory 214.

For example, address generator 212 may generate addresses in a compacted canonical form that includes a 48-bit address portion and a 1-bit error indicator, but the invention is not so limited. For one embodiment address conversion logic 213 may convert between a 49-bit compact representation of a canonical 64-bit virtual address and a 40-bit physical address suitable to addressing local memory 215 and cache memory 225, but the invention is not so limited. For alternative embodiments compact representation of a canonical addresses may have 50 or more bits and physical addresses may have 42 bits, 43 bits, 44 bits, 48 bits or any other conveniently chosen number of bits.

Processor 201 may also include cache memory 214, control 211, and instruction decoder 210 for decoding and executing an instruction set, the instruction set comprising, for example, a CPUID instruction, a CALL instruction, a JMP instruction and a MOV instruction. For one embodiment of processor 201, such instructions may be fetched from cache memory 214 using compact representations of addresses received on address bus(ses) 209 and generated by address generator 212. Alternatively, instructions may be fetched from cache memory 225 using addresses from conversion logic 213 or from local memory 215 using addresses from conversion logic 213 received via local memory bus(ses) 218. Similarly, data other than instructions may also be read from or written to cache memory 214 or local memory 215.

The computing system may also include additional components such as graphics memory 216 and/or bridges 217 and system bus(ses) 219 which similarly facilitate storage and transfer of instructions and or data. It will be appreciated that such a computing system may include any number of other additional components such as, for example, a graphics controller, peripheral system(s), disk and I/O system(s), network system(s) and additional memory system(s).

Figure 3A:
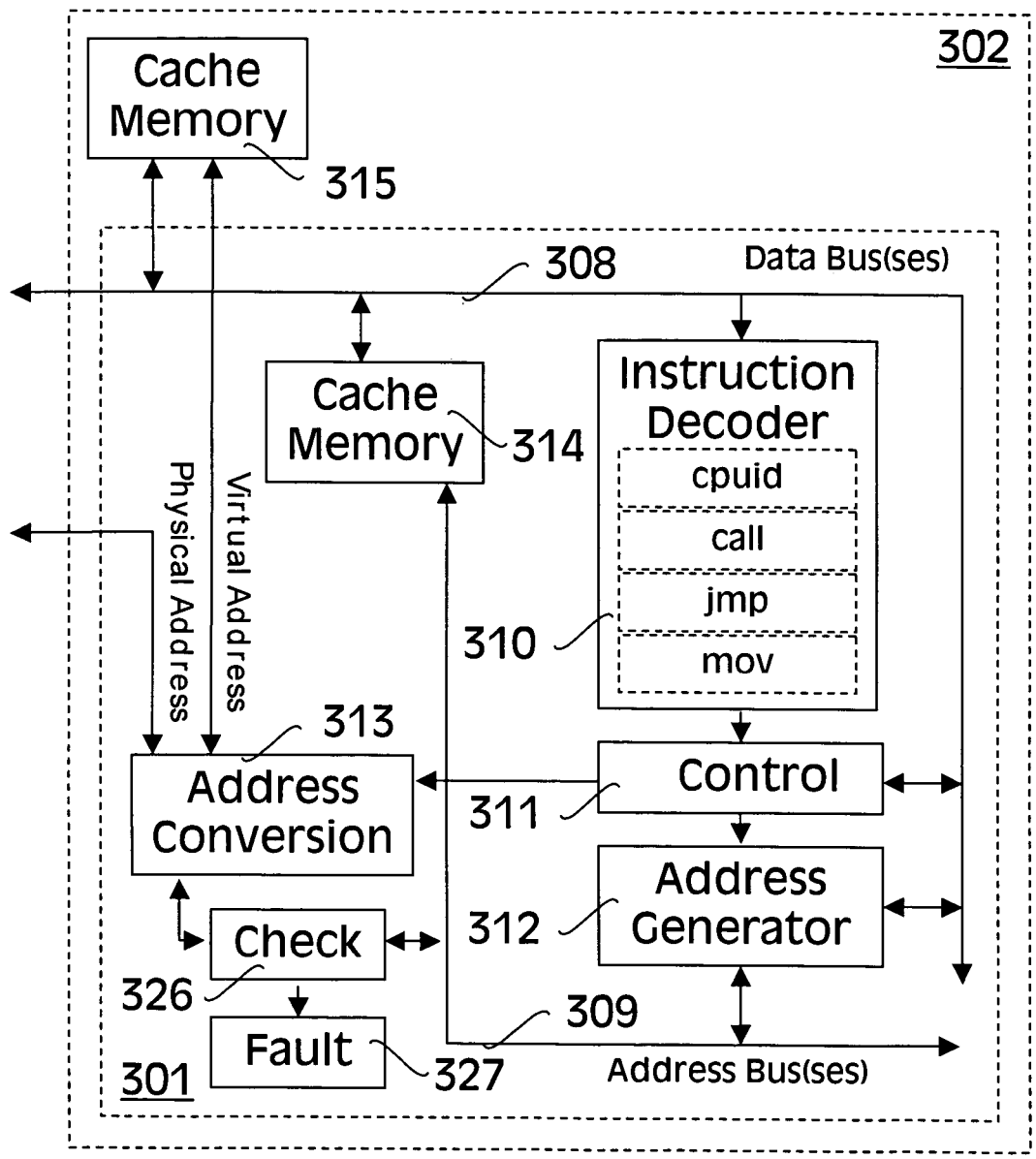
FIG. 3a illustrates one embodiment of a processor, which uses addresses in a compacted canonical form.

FIG. 3a illustrates one embodiment of a processor 301, which uses addresses in a compacted canonical form. Processor 301 includes address conversion logic 313 for converting addresses between in a compacted canonical form and an uncompacted canonical form. Processor 301 also includes address generator 312 for generating addresses in a compacted canonical form. Processor 301 may also include cache memory 314, control 311, and instruction decoder 310 for decoding and executing an instruction set. Instructions and data may be fetched from cache memory 314 via data bus(ses) 308 using compact representations of addresses received on address bus(ses) 309 and generated by address generator 312. For one embodiment, address conversion logic 313 may convert between compacted canonical addresses and uncompacted canonical virtual addresses suitable to address cache memory 315. For one embodiment, address conversion logic 313 may also convert between compacted canonical addresses and uncompacted canonical or physical addresses. For one alternative embodiment, processor 302 also includes cache memory 315.

Figure 3B:
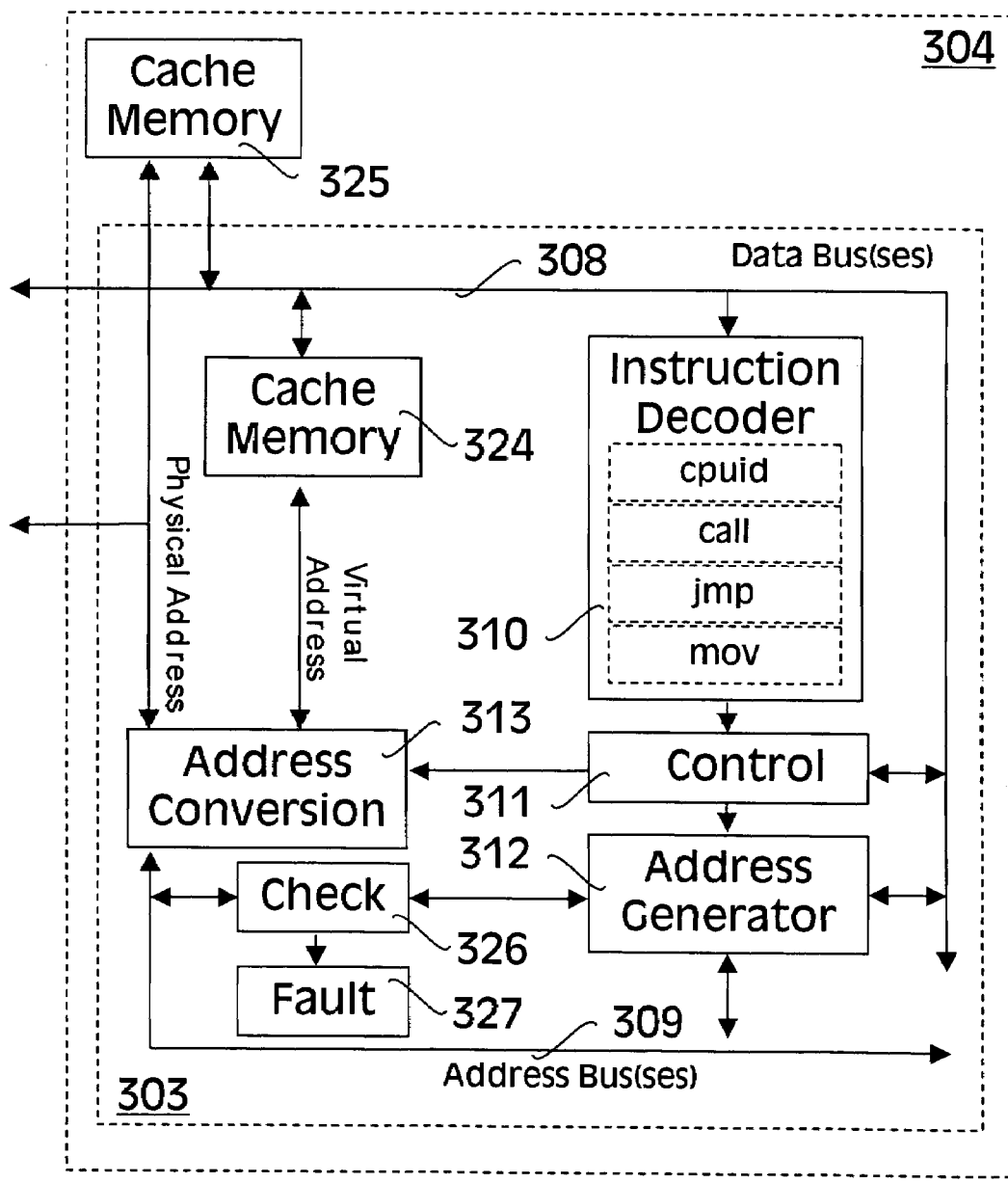
FIG. 3b illustrates an alternative embodiment of a processor, which uses addresses in a compacted canonical form.

FIG. 3b illustrates another alternative embodiment of a processor 303, which uses addresses in a compacted canonical form. Processor 303 includes address conversion logic 313 and address generator 312 for converting and generating addresses in compacted canonical form. Processor 303 may also include cache memory 324, control 311, and instruction decoder 310 for decoding and executing an instruction set. Instructions and data may be fetched from cache memory 324 via data bus(ses) 308 using an uncompacted canonical virtual address converted from a compacted canonical address by address conversion logic 313. For one embodiment, address conversion logic 313 may convert between compacted canonical addresses and uncompacted canonical or physical addresses suitable for addressing cache memory 325. For an alternative embodiment, processor 304 also includes cache memory 325.

Figure 4A:
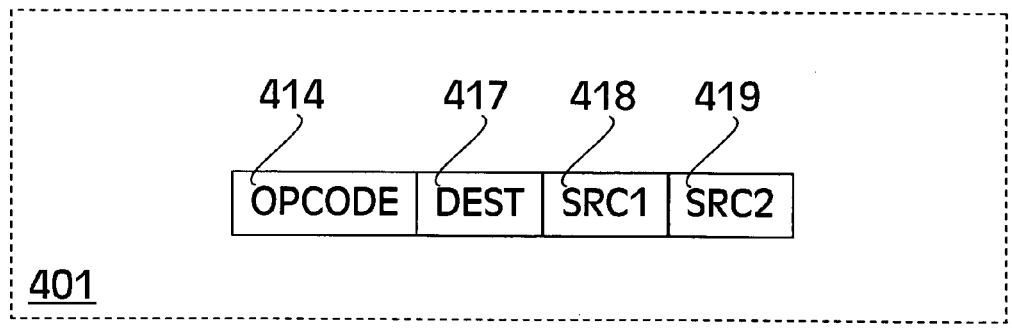
FIG. 4a illustrates an example of an instruction format for execution of instructions on a processor.

FIG. 4a illustrates an example of an instruction format 401 for execution of instructions on a processor, for example, processor 201, processor 301, processor 302, processor 303, or processor 304. Instruction format 401 includes OPCODE 414, and optionally includes a destination operand DEST 417, source operand SRC1 418 and source operand SRC2 419. Instruction format 401 may be of fixed length or of variable length. Optional destination operand DEST 417 and source operands SRC1 418 and SRC2 419 may directly or indirectly indicate register locations or memory locations or may optionally include immediate data operands.

Figure 4B:
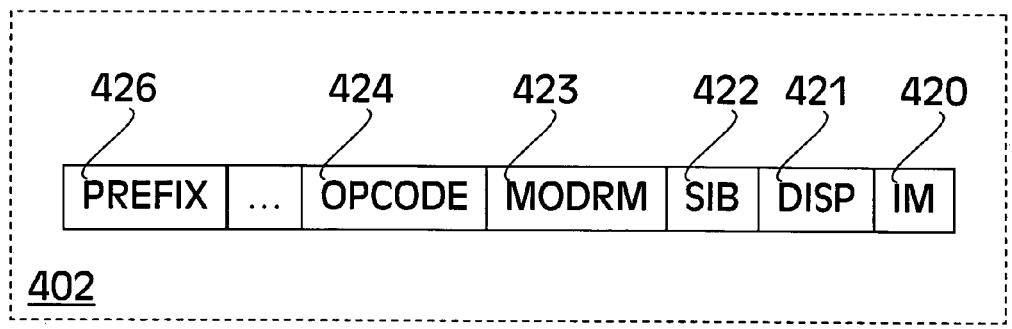
FIG. 4b illustrates an alternative example of an instruction format for execution of instructions on a processor.

FIG. 4b illustrates another example of an instruction format 402 for execution of instructions on a processor. This format corresponds with the general integer opcode format described in the "IA-32 Intel Architecture Software Developer's Manual, Volume 2: Instruction Set Reference," available from Intel Corporation, by calling 1-800-548-4725 or by visiting Intel's literature center at http://www.intel.com. Instruction format 402 includes OPCODE 424, which may comprise one or more bytes. Instruction format 402 optionally includes prefixes such as PREFIX 426, a MODRM 423 byte, an SIB 422 byte, one or more DISP 421 bytes and one or more IM 420 bytes. In one embodiment a source register address or destination register address may be provided in OPCODE 424. In another embodiment, a MODRM 423 byte includes a source register address at bits three through five, which also corresponds to a destination register address. In an alternate embodiment, bits three through five of the MODRM 423 byte corresponds to an opcode extension. In another alternate embodiment, a MODRM 423 byte includes a source register address at bits zero through two, which also corresponds to a destination register address.

In one embodiment, instruction format 402 provides for a memory source address or a memory destination address to be calculated according to an addressing mode provided by instruction format 402. This general format allows register to register, memory to register, register by memory, register by register, register by immediate, and register to memory addressing. In one embodiment, instruction format 402 provides for a programmer to include an immediate value in the one or more IM 420 bytes. These features of instruction format 402 are described in more detail in the "IA-32 Intel Architecture Software Developer's Manual, Volume 2: Instruction Set Reference," in Chapter 2 and Appendix B.

In one embodiment, instruction format 402 provides for an OPCODE 424 associated with a memory address of a default size and/or an operand of a default size. For example, a mode of operation may be provided for a processor, which has by default a 32-bit operand size and a 64-bit memory address size. Alternatively, default 64-bit operand sizes and memory address sizes may be used. For one embodiment of such a processor, the 64-bit memory addresses that are supported must be in a canonical form. It will be appreciated that other modes of operation having various default sizes may also be provided or that a particular OPCODE 424, PREFIX 426, or MODRM 423 encoding may be used to modify or override the default sizes, and that such modifications may be made without departing from the spirit of the invention as claimed.

Figure 4C:
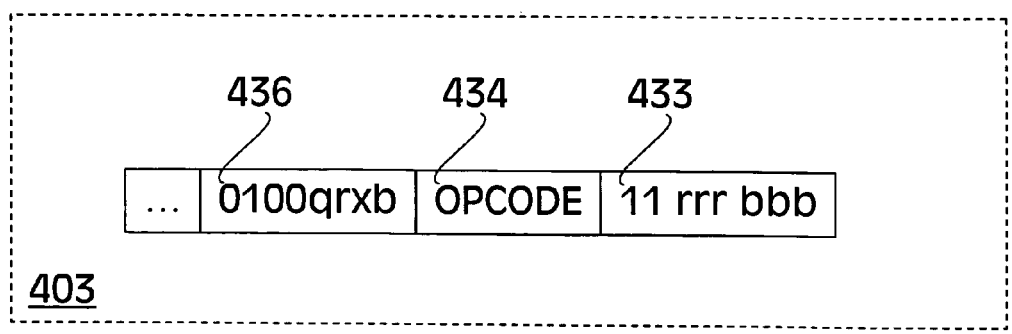
FIG. 4c illustrates an example of an instruction format permitting an optional extension prefix.
Figure 4D:
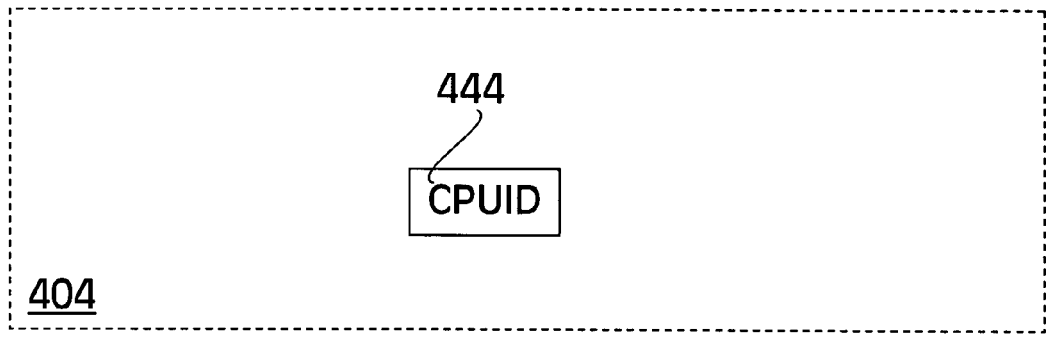
FIG. 4d illustrates an example of an instruction format for execution of a CPUID instruction on a processor.

FIG. 4c illustrates, for example, an instruction format 403 permitting an optional extension PREFIX 436. The optional extension PREFIX 436 may be used to modify a default operand size to 64-bits by setting q equal to 1, for example, or to modify either or both register addresses (specified by bits three through five and bits zero through two) in a MODRM 433 byte (by respectively setting r equal to 1 or b equal to 1 in the optional extension PREFIX 436).

FIG. 4c illustrates an example of an instruction format 404 for execution of an OPCODE 444 of a CPUID instruction on a processor. In one embodiment a CPUID instruction receives arguments implicitly from a register. For example, if a hexadecimal value of 8000 0001 is stored in register EAX, and the CPIUD instruction is executed, an extended processor signature and extended feature bits may be returned. Alternatively, if the hexadecimal values of 8000 0002 and 8000 0003 are stored in register EAX, and the CPIUD instruction is executed twice, once with each value, an ASCII string representing the processor brand name may be returned. One or more of the extended feature bits returned by the CPUID instruction may be set to indicate that the processor supports a particular extended feature, for example, support for 64-bit canonical addresses or data may be indicated by an extended feature bit 29 being set to a value of 1.

Figure 4E:
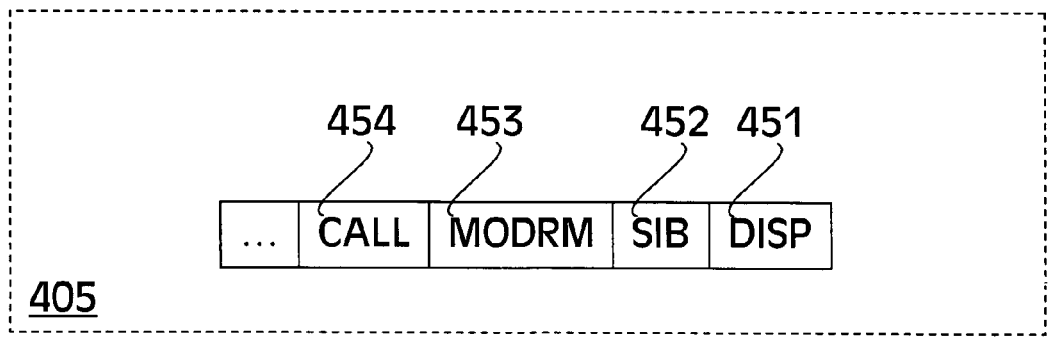
FIG. 4e illustrates an example of an instruction format for execution of a CALL instruction on a processor.

FIG. 4e illustrates an example of an instruction format 405 for execution of an OPCODE 454 of a CALL instruction on a processor. Instruction format 405 optionally includes prefixes, MODRM 453 byte, SIB 452 byte and one or more DISP 451 bytes. Instruction format 405 may be used, for example, to execute an OPCODE 454 of an intrasegment near CALL to a procedure within a current code segment, or to execute an OPCODE 454 of an intersegment far CALL to a procedure in a different code segment, or to execute an OPCODE 454 of an inter-privilege-level far CALL to a procedure in a segment at a different privilege level than the executing procedure or program, or alternatively to execute an OPCODE 454 of a CALL to a procedure in a different task. The MODRM 453 byte may optionally be used to provide a 3-bit extension to OPCODE 454. An address for the called procedure may be indicated directly or indirectly by a selected combination of OPCODE 454, MODRM 453 byte, SIB 452 byte and one or more DISP 451 bytes. For example, an OPCODE 454 having a hexadecimal value of E8 may indicate a direct near CALL using a DISP 451 relative to the next instruction; an OPCODE 454 having a hexadecimal value of FF may indicate an indirect CALL using a near or far address given in a register or memory location indicated by the MODRM 453 byte, and the optional SIB 452 byte and one or more DISP 451 bytes, and an OPCODE 454 having a hexadecimal value of 9A may indicate a direct far CALL using an absolute address indicated by the MODRM 453 byte, and the optional SIB 452 byte and one or more DISP 451 bytes.

Figure 4F:
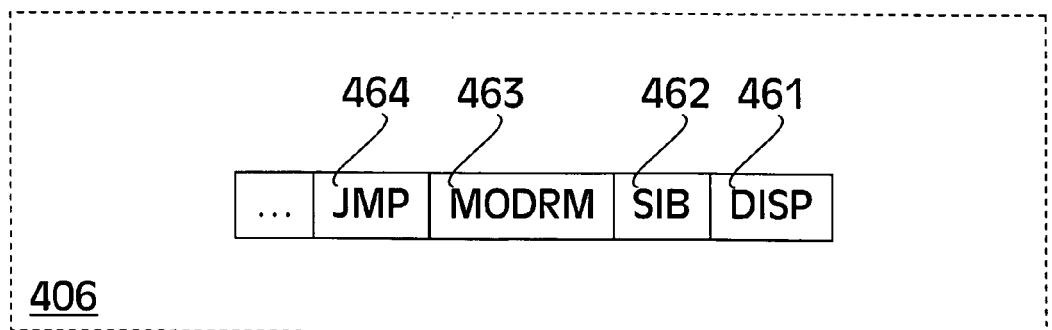
FIG. 4f illustrates an example of an instruction format for execution of a JMP instruction on a processor.

FIG. 4f illustrates an example of an instruction format 406 for execution of an OPCODE 464 of a JMP instruction on a processor. Instruction format 406 optionally includes prefixes, MODRM 463 byte, SIB 462 byte and one or more DISP 461 bytes. Instruction format 406 may be used, for example, to execute an OPCODE 464 of an itrasegment short or near JMP to an instruction within a current code segment, or to execute an OPCODE 464 of an itersegment far JMP to an instruction in a different code segment, or to execute an OPCODE 464 of a JMP to a different task. The MODRM 463 byte may optionally be used to provide a 3-bit extension to OPCODE 464. A target address may be indicated directly or indirectly by a selected combination of OPCODE 464, MODRM 463 byte, SIB 462 byte and one or more DISP 461 bytes. For example, a 1-byte OPCODE 464 having a hexadecimal value of EB or E9 may indicate a direct near JMP using a DISP 461 relative to the next instruction; an OPCODE 464 having a hexadecimal value of FF may indicate an indirect JMP using a near or far address given in a register or memory location indicated by the MODRM 453 byte, and the optional SIB 452 byte and one or more DISP 451 bytes, and an OPCODE 464 having a hexadecimal value of EA may indicate a direct far JMP using an absolute address indicated by the MODRM 463 byte, and the optional SIB 462 byte and one or more DISP 461 bytes. Alternatively, a 2-byte OPCODE 464 beginning with a hexadecimal value of 0F8 may indicate a direct near conditional JMP using a DISP 461 relative to the next instruction.

For one embodiment of a processor and a particular mode of operation, instructions such as CALL and JMP may indicate, by default, 64-bit memory addresses. For an alternative embodiment, only CALL or JMP instructions having particular opcodes or being of a particular type, for example, near CALL instructions and near or short JMP instructions, indicate a 64-bit address by default. For one embodiment a DISP 451 or DISP 461 may include a 64-bit displacement offset. It will be appreciated that other instructions may similarly be included for control of execution flow in a processor which uses canonical addresses, for example, RETURN, LOOP, POP, PUSH, ENTER, or LEAVE.

Figure 4G:
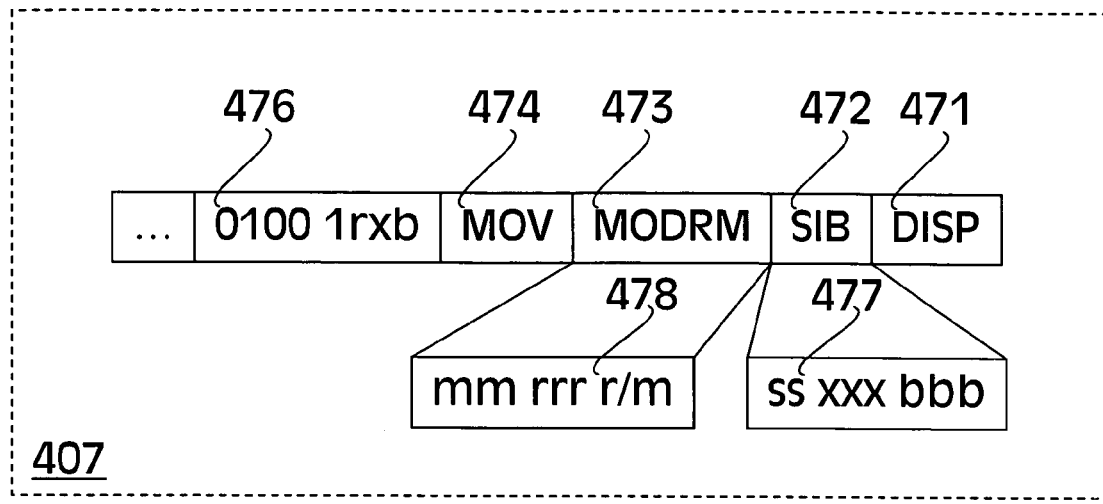
FIG. 4g illustrates an example of an instruction format for execution of a MOV instruction on a processor to move data to or from an addressable storage location.

FIG. 4g illustrates an example of an instruction format 407 for execution on a processor of an OPCODE 474 of a MOV instruction to move data to or from an addressable storage location. Instruction format 407 optionally includes prefixes such as PREFIX 476, and one or more DISP 471 bytes. Instruction format 407 may be used, for example, to execute an OPCODE 474 of a MOV instruction to move data to or from a storage location in memory addressable relative to the next instruction. A MODRM 473 byte of format 478 may optionally be used with OPCODE 474 to provide a 2-bit addressing mode (mm), a 3-bit opcode extension and/or register address (rrr) and a register or memory addressing mode (r/m) optionally including an SIB 472 byte and one or more DISP 471 bytes. An SIB 472 byte of format 477 may optionally be used with MODRM 473 to provide a 2-bit scale factor (ss), a 3-bit index register (xxx) and a 3-bit base register (bbb).

Figure 4H:
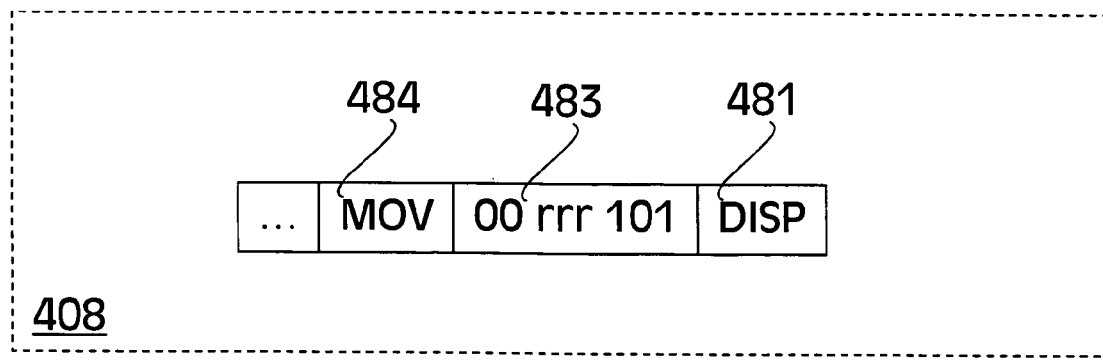
FIG. 4h illustrates an example of an instruction format for execution of a MOV instruction on a processor to move data to or from a storage location using a relative address.

FIG. 4h illustrates one alternative example of an instruction format 408 for execution on a processor of an OPCODE 484 of a MOV instruction to move data to or from a storage location using a relative address. Instruction format 408 includes an OPCODE 484 byte beginning with, for example, a binary value of 101000 (hexadecimal values A0–A3) to indicate the type of MOV instruction; and also includes one or more DISP 481 bytes to specify a memory offset relative to a base address, for example, an instruction pointer address. A MODRM 483 byte may optionally be used with OPCODE 484 to provide, for example, a 2-bit memory addressing mode equal to zero (00), a 3-bit register address (rrr), and a 3-bit relative addressing mode equal to five (101), the relative address specification including one or more DISP 481 bytes. Bit one of the OPCODE 484 byte may be set to indicate that the MOV instruction is to store data from a register to the memory location addressed by DISP 481, or may be cleared to indicate that the MOV instruction is to load data to a register from the memory location addressed by DISP 481. Bit zero of the OPCODE 484 byte may be set to indicate that the MOV instruction will use a default word size for the data, or may be cleared to indicate a 1-byte data size. Alternatively, an optional prefix may be included in instruction format 408 to modify or override the default word size. The memory offset specified by DISP 481 may also be of a default size according to a particular mode of operation of the processor.

Figure 5:
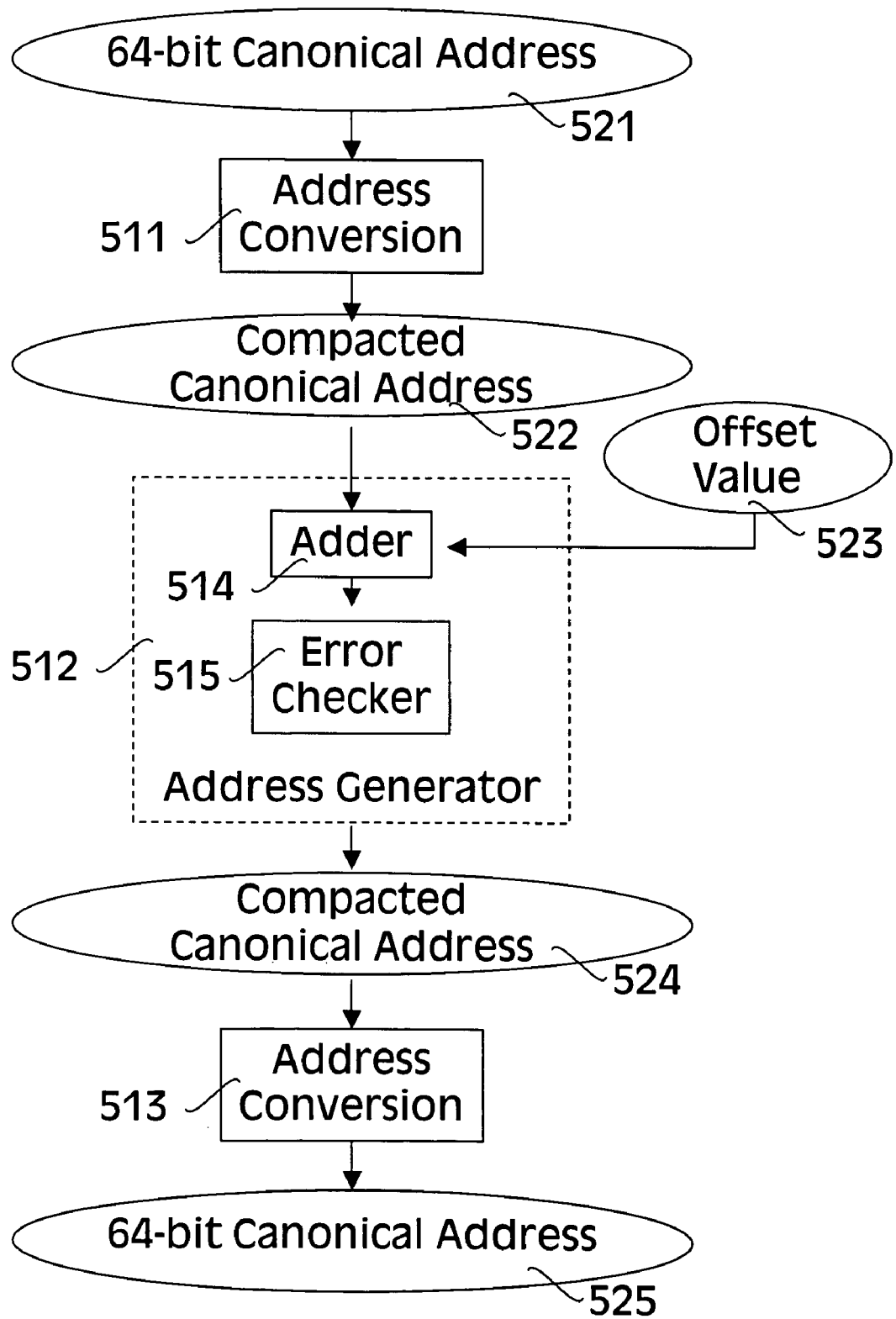
FIG. 5 illustrates a flow diagram for one embodiment of an apparatus converting between 64-bit addresses in canonical form and addresses being generated in a compacted canonical form.

FIG. 5 illustrates a flow diagram for one embodiment of a process for an apparatus to convert between 64-bit addresses in canonical form and addresses that are operated upon in a compacted canonical form. The process illustrated, and other processes herein disclosed are performed by processing blocks that may comprise dedicated hardware or software or firmware operation codes executable by general purpose machines or by special purpose machines or by a combination of both. Address conversion block 511 receives a 64-bit canonical address 521 and generates the corresponding compacted canonical address 522, which is in an acceptable form to be provided as input to address generator block 512. Address generator block 512 may receive the compacted canonical address 522 as an input to adder block 514 and may compute a new compacted canonical address 524 by combining compacted canonical address 522 with an offset value 523. The new compacted canonical address 524 may optionally be checked by error checker block 515 before being provided by address generator block 512 to address conversion block 513. Address conversion block 513 receives the compacted canonical address 524 and generates a corresponding 64-bit canonical address 525. Thus, compacted canonical addresses may be operated upon internally, while 64-bit canonical addresses may be received from and provided to an external system in accordance with the process illustrated.

Figure 6A:
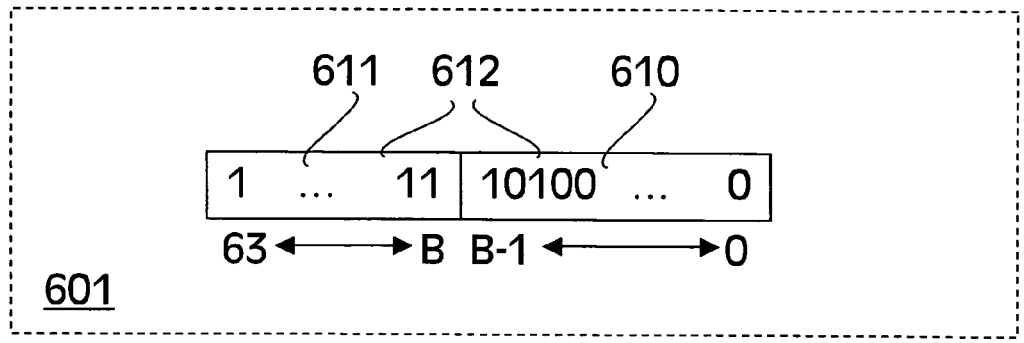
FIG. 6a illustrates one example of an address in a canonical form.

FIG. 6a illustrates one example of an address 612 in a canonical form 601. Address 612 comprises two portions, portion 610 (bits B-1 through 0) and portion 611 (bits 63 through B). Portion 611 may be compared with respect to the most significant bit of portion 610 (bit B-1) to determine if address 612 is valid in canonical form 601. For example, if in portion 611, the values of bits B through 63 all match the value of bit B-1 in portion 610, then address 612 is a valid canonical address in canonical form 601.

Figure 6B:
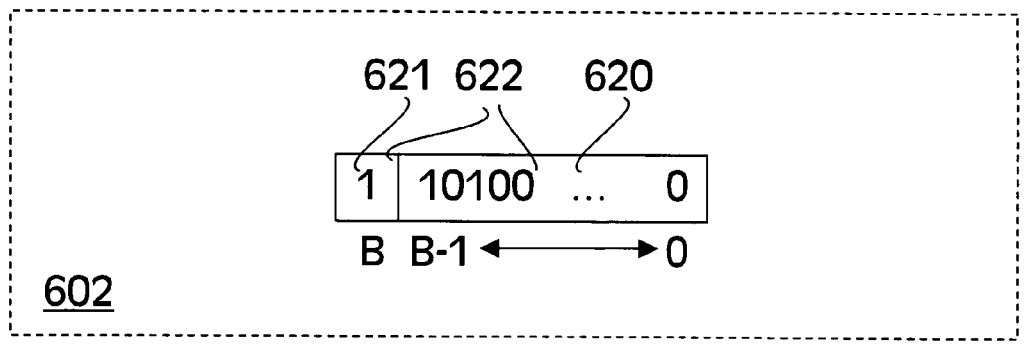
FIG. 6b illustrates one embodiment of an address in a compacted canonical form.

FIG. 6b illustrates one embodiment of an address 622 in a compacted canonical form 602. Address 622 comprises a portion 620 (bits B-1 through 0) and an error indicator 621 (bit B). For example, portion 620 of address 622 may be taken directly from portion 610 of address 612. Error indicator 621 may be computed from portion 611 and portion 610 of address 612. If address 612 is determined to be a valid canonical address, then error indicator 621 may be assigned to a first state, which is equal in value to bit B-1 of portion 620. If, on the other hand, address 612 is determined to be an invalid canonical address, then error indicator 621 may be assigned to a second state, which is not equal in value to bit B-1 of portion 620.

Figure 6C:
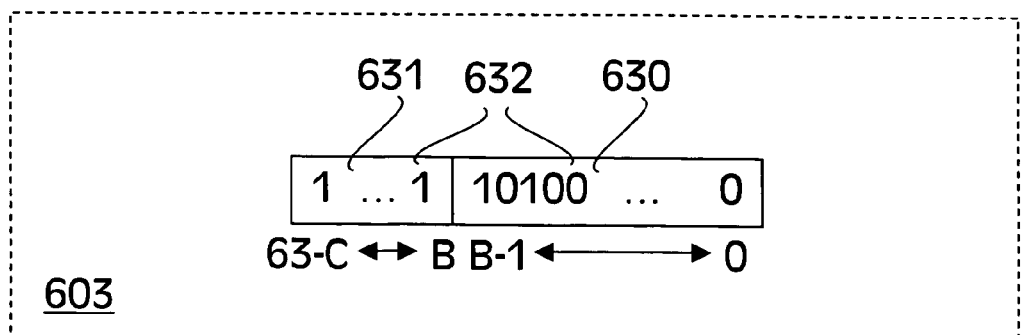
FIG. 6c illustrates an alternative embodiment of an address in a compacted canonical form.

FIG. 6c illustrates an alternative embodiment of an address 632 in a compacted canonical form 603. Address 632 comprises a portion 630 (bits B-1 through 0) and an error indicator 631 (bits 63-C through B). Portion 630 of address 632 may be taken directly from portion 610 of address 612. Error indicator 631 may be computed from portion 611 and portion 610 of address 612. If address 612 is determined to be a valid canonical address, then error indicator 631 may be assigned to a first state, in which each bit of error indicator 631 is equal in value to bit B-1 of portion 630. If, on the other hand, address 612 is determined to be an invalid canonical address, then error indicator 631 may be assigned to a second state, in which each bit of error indicator 631 is not equal in value to bit B-1 of portion 620. It will be appreciated that assignment of error indicator states may be conveniently chosen from a multitude of different possibilities.

FIG. 7a illustrates, for example, one embodiment of a compact representation for a 64-bit canonical address corresponding to the compacted canonical form 602. A 64-bit address space 701 includes non-canonical address space 711. In the canonical address space, the lowest non-negative 64-bit hexadecimal address of 0000 0000 0000 0000 is represented by a 49-bit compact representation of hexadecimal address 0 0000 0000 0000. The highest positive canonical hexadecimal address of 0000 7FFF FFFF FFFF is represented by a 49-bit compact representation of hexadecimal address 0 7FFF FFFF FFFF. The lowest negative hexadecimal address of FFFF 8000 0000 0000 is represented by a 49-bit compact representation of hexadecimal address 1 8000 0000 0000. The highest negative 64-bit hexadecimal address of FFFF FFFF FFFF FFFF is represented by a 49-bit compact representation of hexadecimal address 1 FFFF FFFF FFFF. In the non-canonical address space 711, all the addresses between hexadecimal addresses 0000 8000 0000 0000 and FFFF 7FFF FFFF FFFF inclusive are aliased upon the 49-bit compact representations of hexadecimal addresses 0 8000 0000 0000 through 1 7FFF FFFF FFFF.

FIG. 7b illustrates an alternative embodiment of a compact representation for a 64-bit canonical address. The 64-bit address space 702 includes non-canonical address space 721. In the canonical address space, the lowest non-negative 64-bit hexadecimal address of 0000 0000 0000 0000 is represented by a 50-bit compact representation of hexadecimal address 3 0000 0000 0000. The highest positive canonical hexadecimal address of 0000 7FFF FFFF FFFF is represented by a 50-bit compact representation of hexadecimal address 3 7FFF FFFF FFFF. The lowest negative hexadecimal address of FFFF 8000 0000 0000 is represented by a 50-bit compact representation of hexadecimal address 2 8000 0000 0000. The highest negative 64-bit hexadecimal address of FFFF PFFF FFFF FFFF is represented by a 50-bit compact representation of hexadecimal address 2 FFFF FFFF FFFF. In the non-canonical address space 721, all the addresses between hexadecimal addresses 0000 8000 0000 0000 and FFFF 7FFF FFFF FFFF inclusive are aliased upon the 50-bit compact representations of hexadecimal addresses 3 8000 0000 0000 through 2 7FFF FFFF FFFF.

It will be appreciated that for one embodiment of a compact representation of canonical addresses, error indicator states may be defined so that incremental computations involving compact representations of the highest negative canonical addresses wrap into compact representations of the lowest positive canonical addresses but the invention is not so limited.

Figure 8A:
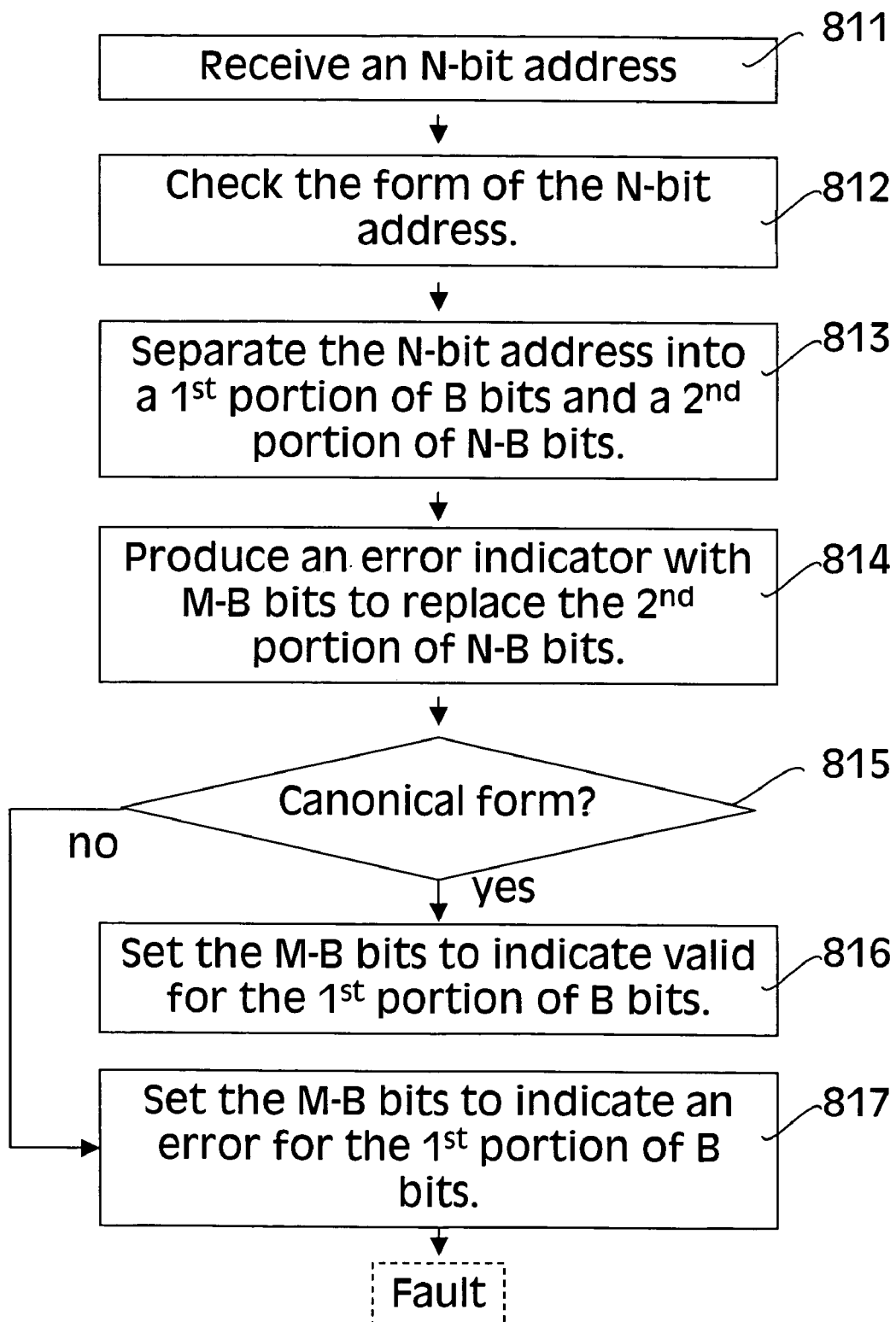
FIG. 8a illustrates a flow diagram for one embodiment of a process to convert from an address in canonical form to an address in compacted representation.

FIG. 8a illustrates a flow diagram for one embodiment of a process to convert from an N-bit address in canonical form to an M-bit address in compacted representation. In processing block 811, an N-bit address is received. Processing continues in processing block 812 where the form of the N-bit address is checked. Processing then proceeds to processing block 813. In processing block 813 the N-bit address is separated into a first portion of B bits and a second portion of N-B bits. Processing continues in processing block 814 where an error indicator of M-B bits is produced to replace the second portion of N-B bits. In processing block 815, processing is directed to processing block 816 if the N-bit address was in canonical form, and to processing block 817 if the N-bit address was not in canonical form. In processing block 816 the error indicator of M-B bits is set for the first portion of B bits to indicate a valid canonical address. In processing block 817 the error indicator of M-B bits is set for the first portion of B bits to indicate an invalid canonical address. Optionally, processing continues from processing block 817 by initiating a fault.

Figure 8B:
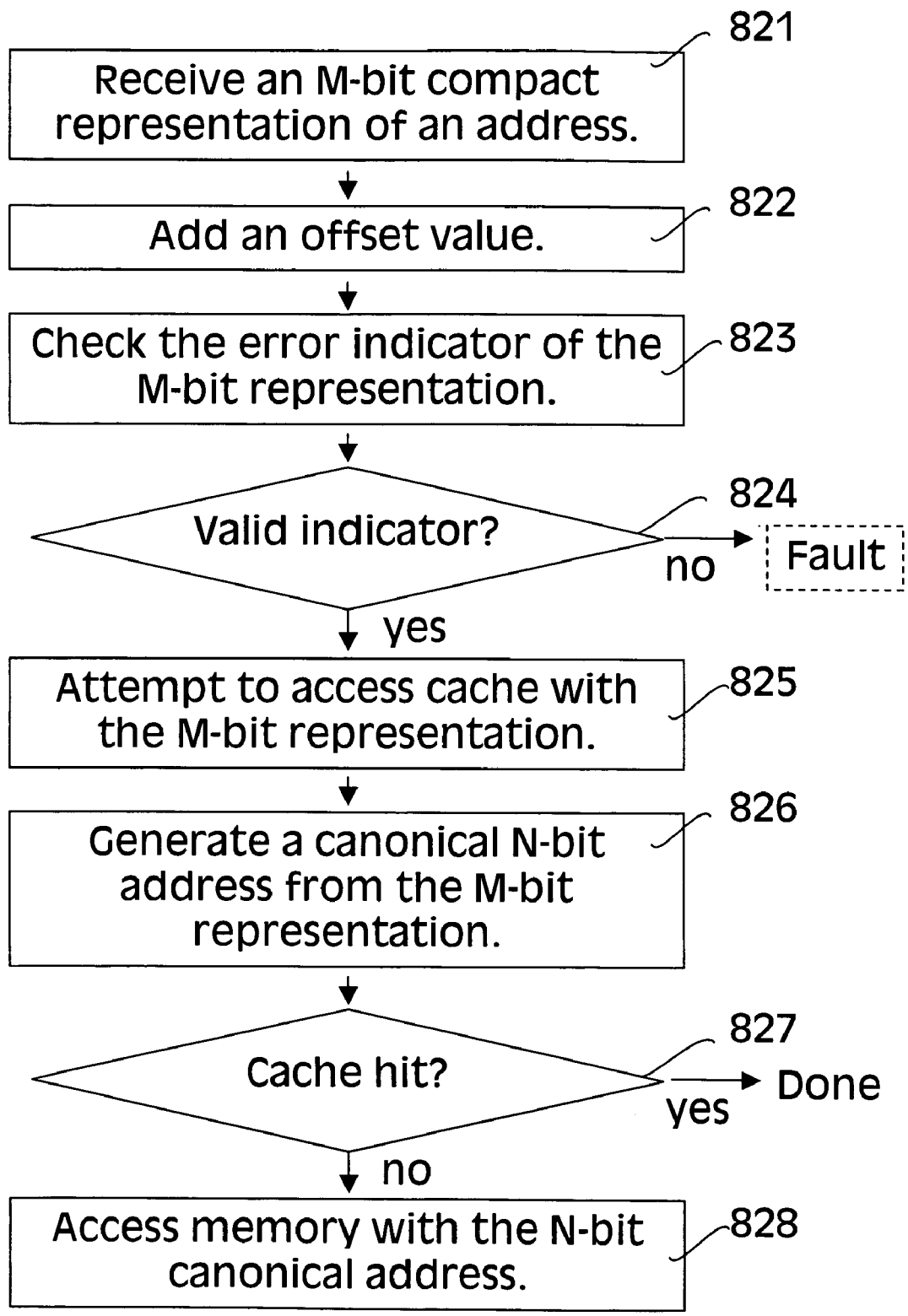
FIG. 8b illustrates a flow diagram for one embodiment of a process to compute an address in a compacted representation.

FIG. 8b illustrates a flow diagram for one embodiment of a process to compute and use an address in an M-bit compact representation. In processing block 821, an M-bit compact representation of an address is received. Processing continues in processing block 822 where an offset value is added to the M-bit compact representation. Processing then proceeds to processing block 823 where an error indicator of M-B bits is checked to determine if it corresponds to a valid canonical address.

It will be appreciated that the number of error indicator bits may be conveniently selected in accordance with the size of the offset value being added.

In processing block 824, processing is directed to processing block 825 if the error indicator corresponds to a valid canonical address. If it does not correspond to a valid canonical address, processing optionally continues from processing block 824 by initiating a fault. Otherwise, in processing block 825, an attempt is made to access cache with the M-bit compact representation. In processing block 826 an N-bit canonical address is also generated from the M-bit compact representation. Processing terminates from processing block 827 if the attempted cache access was a successful cache hit. Otherwise the N-bit canonical address is used to access memory in processing block 828.

Figure 8C:
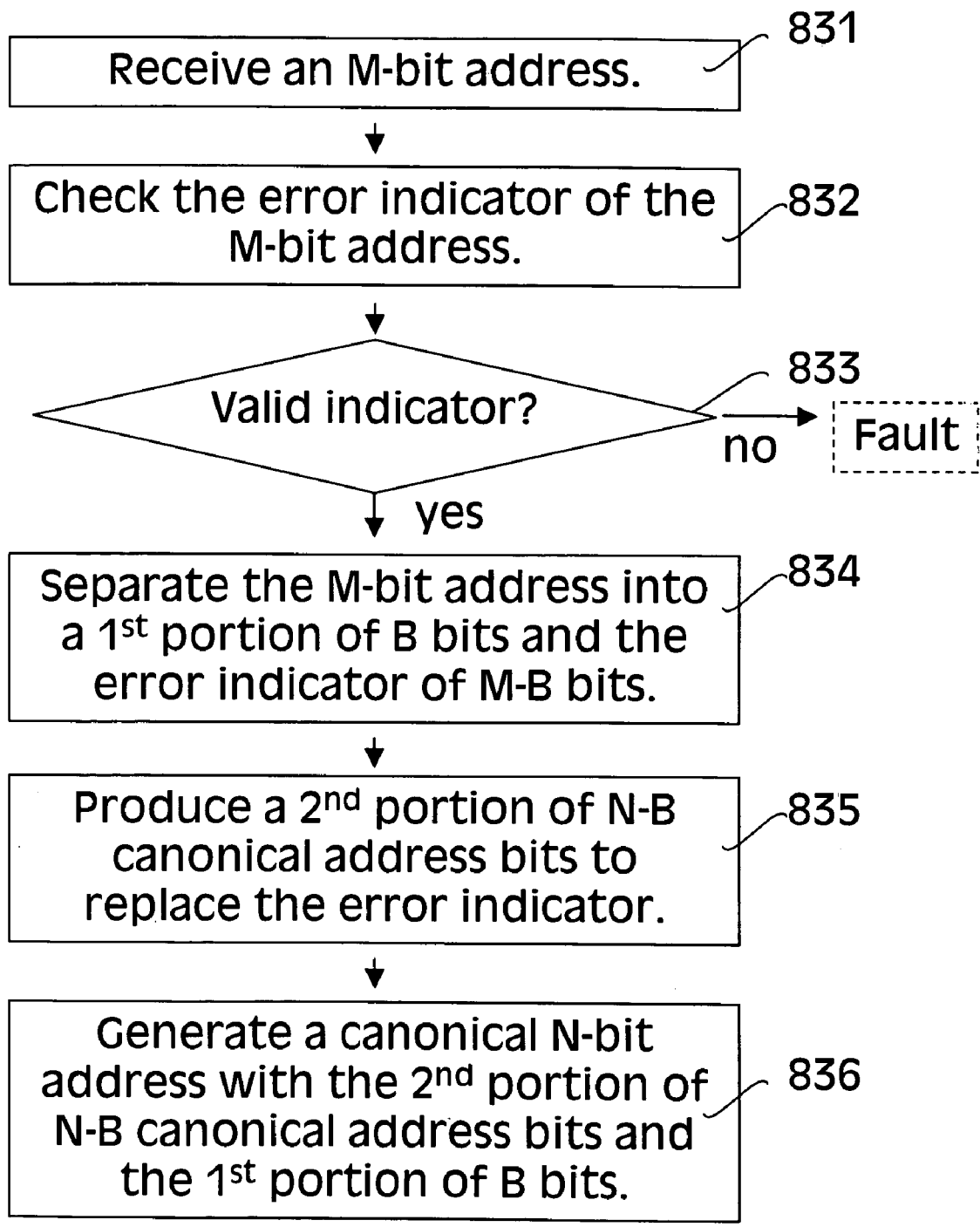
FIG. 8c illustrates a flow diagram for one embodiment of a process to convert from a compacted representation to an address in a canonical form.

FIG. 8c illustrates a flow diagram for one embodiment of a process to convert from an M-bit compact representation to an N-bit address in a canonical form. In processing block 831, an M-bit compact representation of an address is received. Processing continues in processing block 832 where an error indicator of the M-bit address is checked to determine if it corresponds to a valid canonical address. In processing block 833, processing is directed to processing block 834 if the error indicator corresponds to a valid canonical address. If the error indicator does not correspond to a valid canonical address, processing optionally continues from processing block 833 to the initiation of a fault. Otherwise, in processing block 834, the M-bit compact representation is separated into a first portion of B bits and the error indicator of M-B bits. In processing block 835 a second portion of N-B canonical address bits is generated with respect to the first portion to replace the error indicator. Processing continues in processing block 836 where an N-bit canonical address is generated using the second portion of N-B canonical address bits together with the first portion of B bits.

It will be appreciated that an error indicator may be conveniently selected to facilitate processing by improving the computation speed, simplifying the error checking or reducing the cost of production. For one embodiment error checking may be accomplished by checking to see if each bit of the error indicator is equal in value to the most significant bit of the first portion of the address. For example, if the $49^{th}$ bit is equal in value to the $48^{th}$ bit in one embodiment of a 49-bit compact representation as shown in FIG. 7a, then the compact representation corresponds to a valid canonical address. For another embodiment the error indicator may be checked with respect to the first portion of the address to see if it is in one of a set of valid states. For example if the error indicator has a value of 2 and the most significant bit of the first portion of the address has a value of 1, or if the error indicator has a value of 3 and the most significant bit of the first portion of the address has a value of 0 in the embodiment of a 50-bit compact representation shown in FIG. 7b, then the compact representation corresponds to a valid canonical address.

Similarly, generation of the N-B canonical address bits for replacing the error indicator may be accomplished for one embodiment by duplication of the most significant bit of the first portion of the address, or for an alternative embodiment by duplication of the error indicator, or for yet another alternative embodiment by accessing a table according to the error indicator and the most significant bit of the first portion of the address, or by other alternative means.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

The invention claimed is:

1. A method comprising:
receiving an address;
producing a first indicator with respect to a portion of the address when the address is received in a canonical form;
producing a second indicator with respect to the portion of the address when the address is received in a non-canonical form; and
storing the indicator produced, together with the portion of the address, to represent the address received.

2. The method of claim 1 wherein the portion of the address is less than the entire address.

3. The method of claim 1 wherein the address received comprises 64 bits.

4. The method of claim 3 wherein the portion of the address comprises 48 bits.

5. The method of claim 4 wherein the indicator is 1 bit.

6. An article of manufacture comprising
a machine-accessible medium including data that when accessed by a machine, cause the machine to perform the method of claim 5.

7. An apparatus comprising:
an address calculation unit to generate an M-bit compact representation of an N-bit address, M being less than N;
error checking logic coupled with the address calculation unit to indicate whether the N-bit address represented by the M-bit compact representation would be in a canonical form;
a fault generator to generate a fault when the error checking logic indicates that the N-bit address would be in a non-canonical form; and
address translation logic to receive the M-bit compact representation and to produce the corresponding N-bit address.

8. An apparatus comprising:
an address calculation unit to generate an M-bit compact representation of an N-bit address, M being less than N;
error checking logic coupled with the address calculation unit to indicate whether the M-bit compact representation represents an N-bit address having a first canonical form; and
address conversion logic to receive the M-bit compact representation and to produce the corresponding N-bit address.

9. The apparatus of claim 8 further comprising:
a fault generator to generate a fault when the error checking logic indicates that the N-bit address would not be in the first canonical form.

10. The apparatus of claim 8 wherein the error checking logic is also configurable to indicate whether the M-bit compact representation represents an N-bit address having a second canonical form different from the first canonical form.

11. The apparatus of claim 10 further comprising:
a fault generator to generate a fault responsive to an indication from the error checking logic that the N-bit address would not be in the first canonical form or responsive to an indication from the error checking logic that the N-bit address would not be in the second canonical form.

12. The apparatus of claim 10 wherein N is equal to 64.

13. The apparatus of claim 12 wherein M is greater than 49.

14. The apparatus of claim 13 wherein M is equal to 50.

15. The apparatus of claim 10 wherein an N-bit address having the second canonical form addresses any one of $2^{48}$ storage locations.

16. An article of manufacture comprising:
a machine-accessible medium including data that, when accessed by the machine, cause the machine to:
receive a first M-bit compact representation of an N-bit address, M being less than N,
add an offset value to the first M-bit compact representation to generate a second M-bit compact representation; and
check if the second M-bit compact representation includes a valid indicator of a canonical N-bit address;
generate a canonical N-bit address from the second M-bit compact representation; and
access memory using the canonical N-bit address.

17. The article of manufacture of claim 16, the machine-accessible medium further including data that, when accessed by the machine, cause the machine to:
indicate whether the M-bit compact representation represents an N-bit address having a second canonical form different from the first canonical form.

18. The article of manufacture of claim 17, the machine-accessible medium further including data that when accessed by the machine, cause the machine to:
generate a fault responsive to an indication that the N-bit address would not be in the first canonical form or responsive to an indication that the N-bit address would not be in the second canonical form.

19. The article of manufacture of claim 18 wherein N is equal to 64.

20. The article of manufacture of claim 18 wherein M is greater than 49.

21. The article of manufacture of claim 20 wherein M is equal to 50.

22. The article of manufacture of claim 18 wherein an N-bit address having the second canonical form addresses any one of $2^{48}$ storage locations.

23. The apparatus of claim 7 wherein the error checking logic is also configurable to indicate whether the M-bit compact representation represents an N-bit address having a second canonical form different from the first canonical form.

24. The apparatus of claim 23 wherein an N-bit address having the second canonical form addresses any one of $2^{48}$ storage locations.

25. The apparatus of claim 7 wherein N is equal to 64.

26. The apparatus of claim 25 wherein M is greater than 49.

27. The apparatus of claim 26 wherein M is equal to 50.

28. An apparatus comprising:
receiving means for receiving an address;
checking means for producing a first indicator with respect to a portion of the address when the address is received in a canonical form and for producing a second indicator with respect to the portion of the address when the address is received in a non-canonical form; and storage means for storing the indicator produced, together with the portion of the address, to represent the address received.

29. The apparatus of claim 28 wherein the portion of the address is less than the entire address.

30. The apparatus of claim 28 wherein the address received comprises 64 bits.

31. The apparatus of claim 30 wherein the portion of the address comprises 48 bits.

32. The apparatus of claim 31 wherein the indicator is 1 bit.

* * * * *